US006982765B2

(12) United States Patent
Testin et al.

(10) Patent No.: US 6,982,765 B2
(45) Date of Patent: Jan. 3, 2006

(54) MINIMIZING VIDEO DISTURBANCE DURING SWITCHING TRANSIENTS AND SIGNAL ABSENCE

(75) Inventors: William John Testin, Indianapolis, IN (US); Ronald Thomas Keen, Indianapolis, IN (US); Mark Alan Nierzwick, Brownsburg, IN (US)

(73) Assignee: Thomson Licensing, Billancourt (FR)

( * ) Notice: Subject to any disclaimer, the term of this patent is extended or adjusted under 35 U.S.C. 154(b) by 533 days.

(21) Appl. No.: 10/222,001

(22) Filed: Aug. 15, 2002

(65) Prior Publication Data

US 2003/0053000 A1   Mar. 20, 2003

Related U.S. Application Data

(60) Provisional application No. 60/322,097, filed on Sep. 14, 2001.

(51) Int. Cl.
*H04N 3/24* (2006.01)
(52) U.S. Cl. .................. 348/634; 348/569; 348/565
(58) Field of Classification Search ............. 348/634, 348/569, 553, 533, 564, 607, 565, 567, 180, 348/194; 725/38, 39
See application file for complete search history.

(56) References Cited

U.S. PATENT DOCUMENTS

| | | | | |
|---|---|---|---|---|
| 3,825,837 A | * | 7/1974 | Briskman | 348/634 |
| 4,536,797 A | * | 8/1985 | Maturo et al. | 348/570 |
| 5,471,251 A | * | 11/1995 | Inaba et al. | 348/634 |
| 6,249,322 B1 | * | 6/2001 | Sugihara | 348/634 |
| 6,300,981 B1 | * | 10/2001 | Kim et al. | 348/563 |

* cited by examiner

*Primary Examiner*—Victor R. Kostak
(74) *Attorney, Agent, or Firm*—Joseph S. Tripoli; Robert D. Shedd; William A. Lagoni (57) ABSTRACT

A television monitor display comprises a first selectable source of a first video display signal and a second selectable source of a second signal for video display. A video processor receives signals from the first and second selectable sources and controllably combines the second signal with said first video display signal. A sync separator is coupled to receive the combined signal and generate therefrom separated synchronizing signals. A controller is responsive to user selection of the first selectable source and generates a disable signal for controlling the video processor to inhibit combining of the second signal for a predetermined time.

7 Claims, 6 Drawing Sheets

Normal Television Vertical Field with Guide OSD Present

Fig. 6

Asynchronous Television Field with Guide OSD Present

MINIMIZING VIDEO DISTURBANCE DURING SWITCHING TRANSIENTS AND SIGNAL ABSENCE This application claims the benefit of Provisional Application No. 60/322,097, filed Sep. 14, 2001.

This invention relates to a video display operable with standard and high definition television signals and in particular to arrangements for mitigating display disturbances during transient disturbances.

BACKGROUND OF THE INVENTION

In a television display capable of operation with standard (1H or SD) and high definition television (2H or HD) signals and including an on-screen TV Guide, synchronization problems can result as a consequence of standard definition (1H) scanning frequency up conversion, the TV Guide and on screen display (OSD) inter-relationships. An on-screen-display based TV Guide provides a list of available channels, and by use of a cursor, the list can be browsed up or down whilst monitoring a preview of the channel in a ⅑ size picture in picture or PIP. Once the desired channel is found and highlighted, a single button press clears the Guide and displays a full-screen version of the selected channel. In this exemplary receiver, the main NTSC path is digitized at 1H and then up-converted to 2H. The standard TV Menus that are used to control picture parameters like: Color, Tint, Volume, etc. are generated and are inserted by means of a "2H OSD" function located in a video processing IC which generates 2H RGB outputs for coupling to the picture tube. Typically the addition of an on-screen-display TV Guide would be achieved at 2H, however use of an available 1H on-screen-display generator IC necessitated on-screen-display (OSD) insertion into the main signal prior to sync separation and analog to digital conversion. Because the display system operates at 2H, a standard 1H horizontal PLL. and vertical countdown system are not available. As an alternative, the 1H horizontal and 1H vertical sync signals for the Guide OSD are generated by a digital sync separator in the 1H Video Decoder and analog to digital converter IC. In the case that a signal was present in the main video path, the system works properly with the Guide OSD being stably positioned on screen, for example, centered both vertically and horizontally on the screen without any tearing or unwanted motion in the characters. However, when video signals are absent from the main video path, horizontal and vertical sync signals generated by the Video Decoder can become erratic and spuriously timed. These erroneous sync signals result from a digital sync separator in the Video Decoder attempting to lock to noise occurring in the absence of a signal. Because the digital sync separator does not employ a countdown system, the period between verticals is often other than the standard interval of 16.7 mille seconds. As a result, the Guide OSD and PIP preview channel are unstable and essentially unusable. The digital sync separator provides a selectable free run mode, however, non-random noise present during the absence of a demodulated signal precluded selection of the free run mode resulting in the generation of erroneous sync signals.

SUMMARY OF THE INVENTION

In a first inventive arrangement, employed to stabilize horizontal and vertical sync separation in a video display, an input signal is controllably muted, i.e. the video amplitude is reduced to zero, to prevent noise for example, occurring during tuning from falsely triggering the sync separator. This muted input is selected whenever a video signal is determined to be absent, for example, on a selected RF channel or video input, or as a consequence of the video being obscured or located "behind" an on-screen-display. In a second inventive arrangement the on-screen-display is inhibited for approximately 1 field following new channel tuning to allow a sync separator to properly lock to the new main video signal. The inventive first arrangement prevents an unstable Guide presentation during signal absences. The inventive arrangement advantageously provides a second use for a tuning video presence detector which initiates selection of a muted input condition to allow the video decoder to operate successfully in the free run mode and synchronize a stable Guide display.

With the first inventive arrangement stabilizing synchronization during input signal absence, a further inventive arrangement is advantageously employed to eliminate or obscure display signal transients occurring during channel changes while displaying the on-screen Guide. When changing channel between two signals, that are both present or available, as well as switching between present and absent signals, an interruption can occur in the synchronization of Guide OSD. In particular, to stabilize the Guide during an input signal absence, the horizontal and vertical sync separating arrangement is advantageously forced to assume the previously mentioned free-running mode. Furthermore in order to lock to a valid video signal, the horizontal and vertical has to be locked to the incoming video. During tuning, the input (or output therefrom) is muted allowing the Video Decoder to free run and thereby allow the generation of a readable Guide display. Once the channel is tuned, the horizontal and vertical sync signals are relocked to the incoming video. This transition, or lack of synchronism between being locked and unlocked generates unacceptable video transients and perturbations lasting for several seconds. In previous designs a horizontal PLL and countdown circuitry was employed yielding horizontal and vertical signals that were relatively stable during channel changes and thus free running operation of the sync separator was not required.

The Video Decoder IC employs a digital sync separating arrangement and is without the level of noise immunity provided by a PLL with a vertical countdown arrangement. In addition to the noise immunity problem, the overlaying of the OSD on the main video proved to be a problem during a channel change, because when just completed, the incoming video is asynchronous with the previously tuned channel. However, the OSD is locked to the free run frequency and phase of the sync signals from the Video Decoder IC. Depending on the phase relationship of the Guide OSD, which typically is present for approximately 220 of the 262.5 lines in each TV field, relative to the vertical sync of the new channel being tuned, the vertical sync interval of the incoming video may or may not be available to the Video Decoder IC for a considerable time interval. For example, because TV network broadcasters employ extremely accurate and stable reference sync sources the relative drift rates can exceed tens of seconds possibly even minutes before the respective vertical sync signals drift through temporary alignment.

The second inventive arrangement advantageously utilizes the ability of the digital sync separator to achieve lock in approximately 1 field (16 msec) and in addition by advantageously disabling the FSW (fast switch overlay control) line, phasing or synchronization between the OSD (free running syncs) and the incoming sync wave form is eliminated. Furthermore by momentarily blanking the entire screen using the 2H OSD Blanking when switching from the muted input to the desired input, any display transients or perturbations caused by the Video Decoder locking up are concealed and the time to lock the sync separator is greatly reduced.

DETAILED DESCRIPTION

Figure 1:
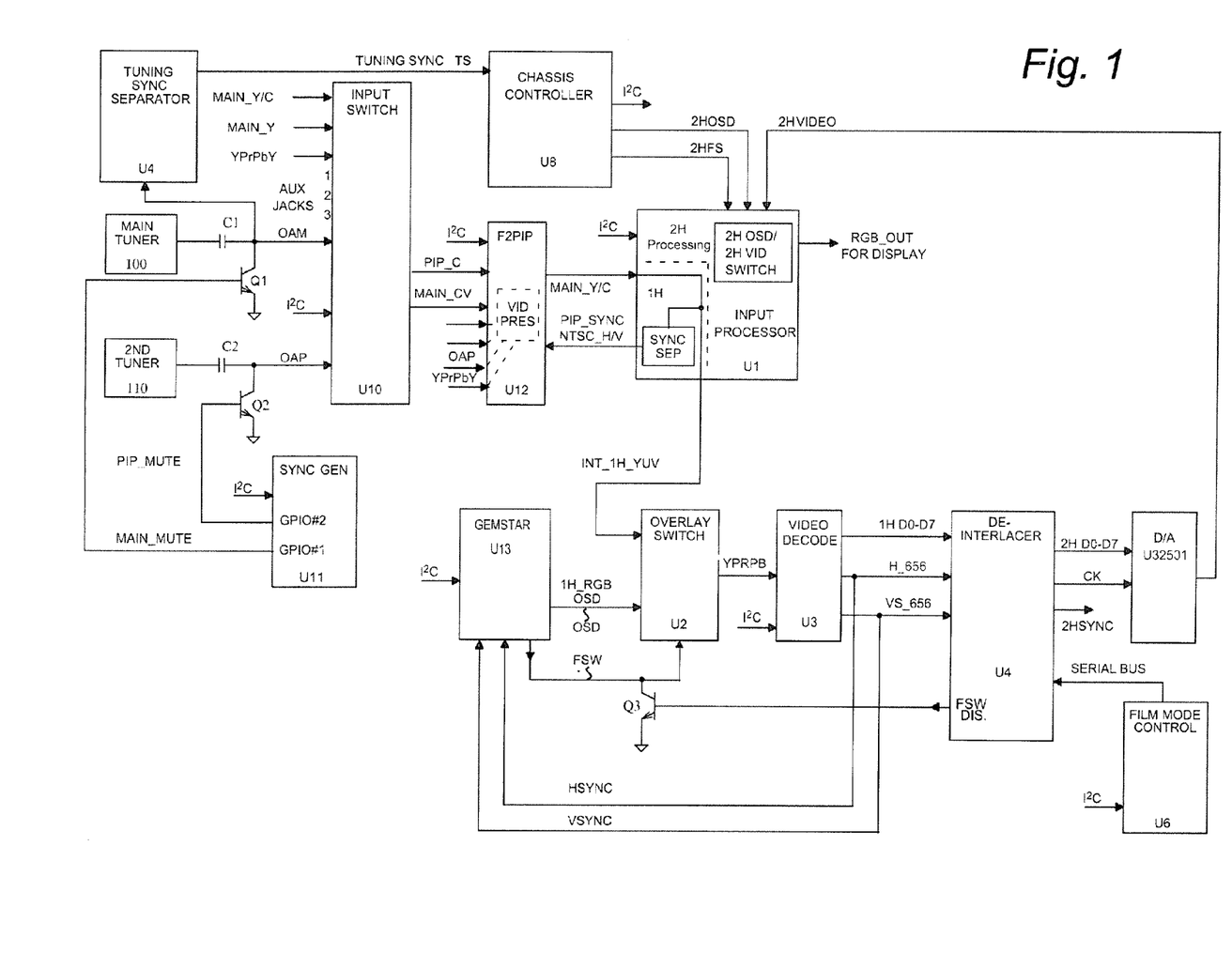
FIG. 1 is a simplified block diagram of a receiver monitor including various inventive arrangements.

FIG. 1 presents a block schematic diagram of the video path and control signals in a receiver monitor. Integrated circuit U10 is a video input switch or cross point that allows user selection between various video inputs, for example the main tuner 100, second tuner 110, component signal Y Pr Pb, Auxiliary inputs 1–3, etc. Since a cross point video switch is used, any one of the video inputs can be routed simultaneously to any of the outputs. Integrated circuit U10 is controlled by I²C bus commands generated by the chassis controller IC U8. For example, when the main tuner video (OAM) is selected by IC U10, the received demodulated signal is buffered and supplied to IC U12, the picture in picture processor F2PIP, as a composite video signal, MAIN_CV. If a picture in picture or PIP presentation is selected from one of the input sources, a second buffered output from switch IC U10, picture in picture composite video, PIP_CV is coupled to IC U12. Integrated circuit U12, the F2PIP processor digitizes both the MAIN_CV and the PIP_CV signals and appropriately inserts the PIP signal into the MAIN_CV signal. The outputs from the FPIP digital to analog converters are analog YC component signals, MAIN_Y/C which is coupled to the 1H portion of IC U1, the Input Processor. The luminance component of signal MAIN_Y/C is output from IC U1 as signal INT_1H_YUV which becomes one two inputs supplied to IC U2, a video overlay switch.

When the on-screen Guide is selected by the user, via an I²C command from chassis controller IC U8, the fast switch, FSW, line is activated for most of the active lines on the screen. However, in order to allow a digital sync separator in Video Decoder IC U3 to lock to the incoming video signal, the FSW line is disabled during the vertical sync interval, approximately lines 1–9, and during the horizontal sync period (see FIG. 5). The combined signal output, Y Pr Pb, from IC U2 is coupled for analog to digital conversion by Video Decoder IC U3, which produces a digital output word "1H D0–D7". In addition IC U3 includes a digital sync separator which produces analog horizontal sync (HSYNC or H_656) and vertical sync (VSYNC or Vs_656) signals derived from the luminance component. These separated sync signals are used to synchronize the Guide on screen display to the incoming video. Both the digitized video and the horizontal and vertical sync signals are coupled to De-Interlacer IC U4. The De-Interlacer IC provides up-conversion of the digitized 1H signal to produce a 2H frequency digital display signal which is D/A converted to form output signal 2H VIDEO. This upconverted signal is coupled to the 2H portion of IC U1 for matrix processing to form red green and blue, RGB_OUT analog video signals for display.

Figure 2:
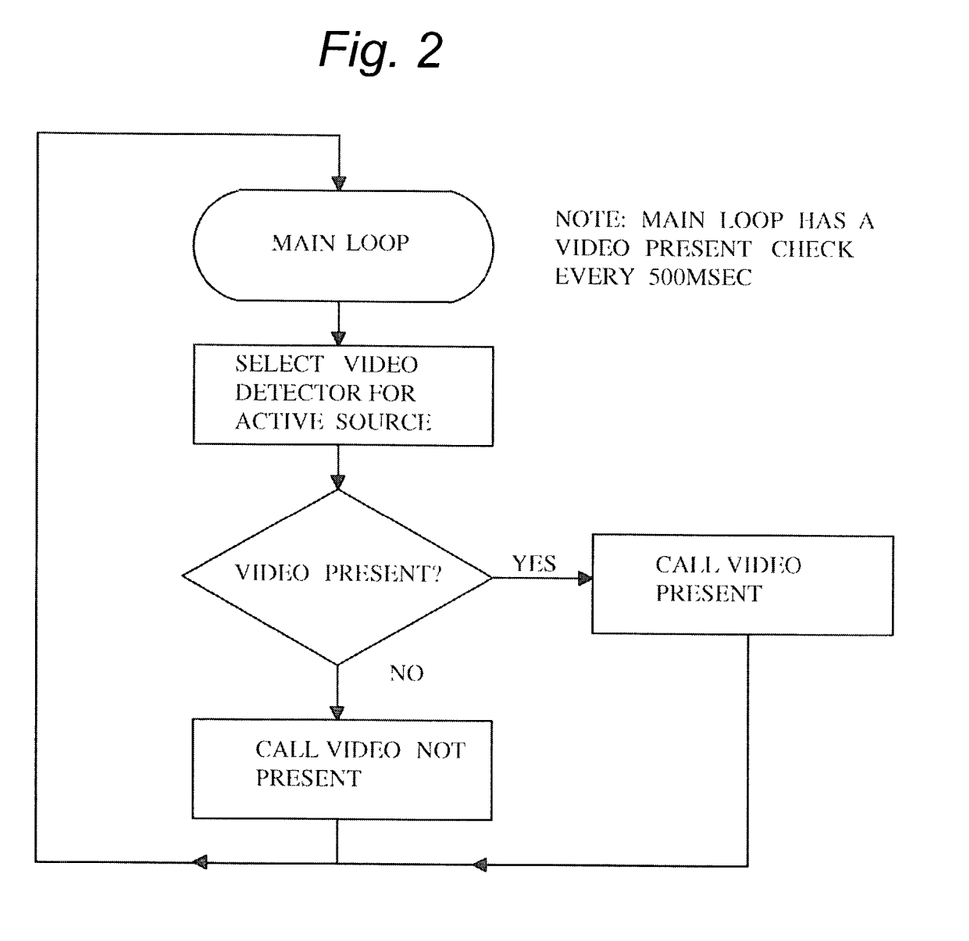
FIG. 2 is a flowchart of the Main Loop Portion of the inventive "no signal" detector software.
Figure 3:
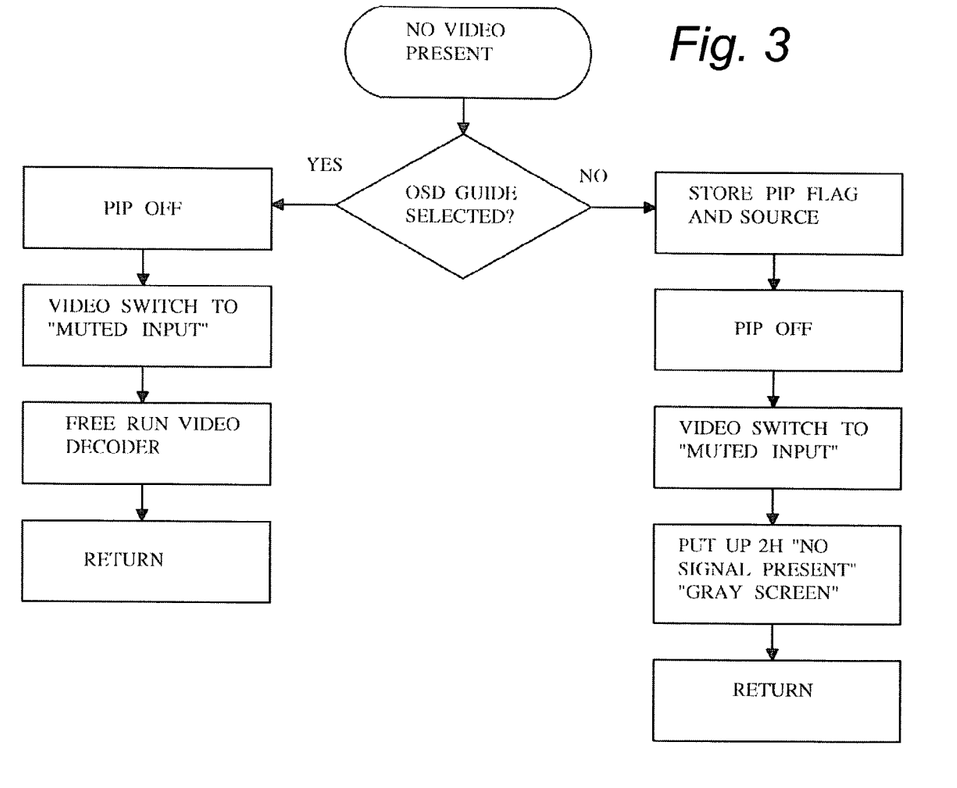
FIG. 3 is a flowchart of the inventive No Video Present Portion of the "no signal" detector software.
Figure 4:
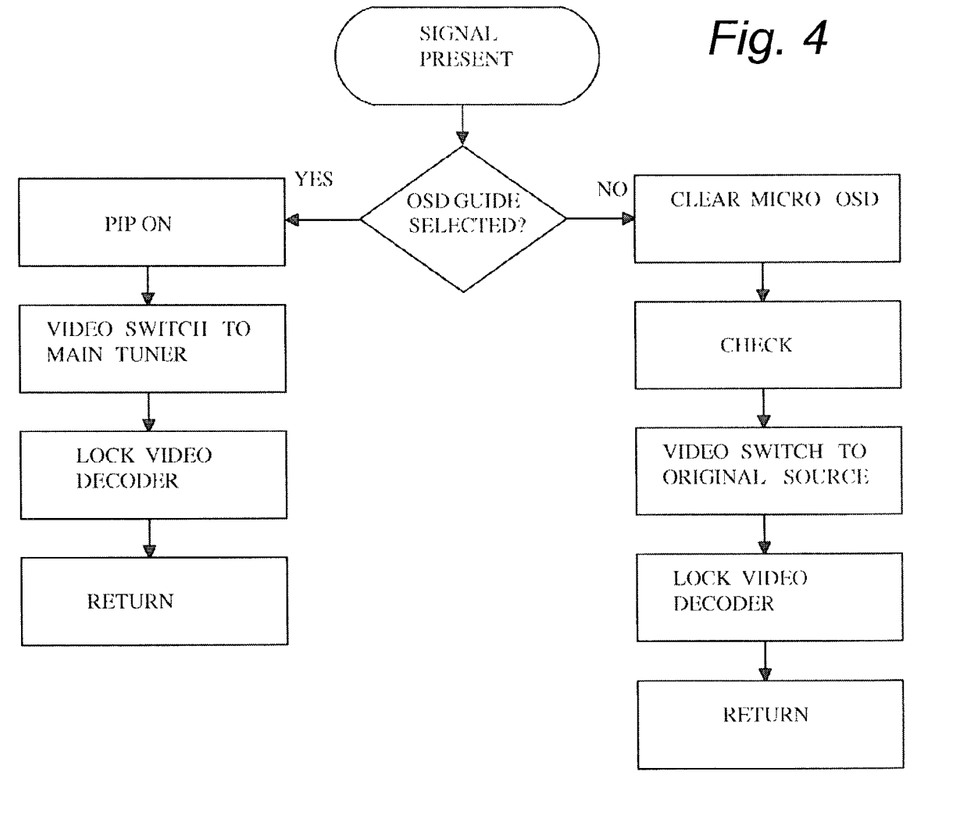
FIG. 4 is a flowchart of the of the inventive Video Present Portion of the "no signal" detector software.

FIG. 2 is a flowchart depicting a portion of an inventive "Main Loop" display software for a periodic testing sequence performed by controller U8. The sequence of FIG. 2 periodically tests for the presence or absence of a video signal on a selected input. Whether the Guide on screen display (OSD) is present or not, repetitive testing occurs at approximately 500 mille second intervals with the result communicated by controller U8. In the case that video is not present, FIG. 3 illustrates the operation of the software depending on whether the OSD Guide is present or not. If the Guide is selected, the PIP is turned off, the muted input is selected, for example by switch Q1 responsive to GPIB#1, causing the Video Decoder sync separator to free run. This noise and signal free input allows the sync separator in the Video Decoder U3 to provide stable asynchronous horizontal and vertical syncs to Gemstar™ IC U13, which generates the Guide OSD. However, if the Guide is not selected, the PIP is turned off, and the muted input is selected, the "2H OSD" circuitry of processor U1 is used to generate a "gray screen" with a text caption display stating "no signal present".

In the case where the Guide OSD is present and the highlighted channel in the Guide does not have a valid video signal present, the chassis controller or main micro U8, will detect that video is absent. The main micro detects the "no video" condition by monitoring the Tuning Sync signal with a hardware detector coupled to the main tuner output for use during channel tuning. The "video presence detector" in micro U8 counts the number of nominally standard width horizontal sync pulses occurring during each field. If an "error count" exceeds a predetermined limit, a data bit is flipped to indicate that video is absent. This sync presence detector is advantageously software controlled to repetitively sample the selected video every 500 mille seconds. When a "no video" condition is detected, (for example as shown in FIG. 3), the main micro advantageously turns off the PIP to eliminate edge noise in the display. In addition, microcontroller U8 outputs an I²C bus command which is decoded by IC U11 to form signal GPIO#2 which mutes or blanks the second tuner 110 output OAP to input selector switch IC U2. Input blanking is achieved by transistor Q2 which is saturated by the decoded control signal GPIO#2. In this way chassis microcontroller U8 asserts a free run condition in Video Decoder U3 and waits for the monitoring loop depicted in FIG. 2 to signal the reappearance of a tuning Sync Signal by testing YES at the video present decision diamond.

When a video signal is subsequently detected, micro U8 generates a blanking signal (2H OSD Blanking) which momentarily blanks the 2H analog RGB display signals, coincidentally Input Switch U10 is switched back to the Main Tuner output to facilitate locking of Video Decoder U3, and PIP is enabled and finally the screen is unblanked by signal 2H OSD Blanking. FIG. 3 also outlines the operation of the "no signal" condition when the Guide is not selected. Since the Tuning Sync detector (U4) associated with the Main Micro U8 monitors only the output (OAM)

from the main tuner output, separate video presence detectors resident within U12 are employed for the 2nd tuner output (OAP) or PIP video feed. In addition other video presence detectors within U12 are supplied with signals from various other inputs to input switch U10 responsive to selective control by controller U8. These input signals, though not selected for immediate display are coupled to inputs SEL. Ipx, and SEL. Ipy of IC U12 and are monitored for the presence of specific signals, for example, component video, Y/C video or NTSC video in order that optimum picture quality can be automatically selected and displayed when there is a choice of different format signal sources. Thus a total of five different detectors are employed to monitor the presence of the various input signals.

The initial problem and solution dealt with video signal loss from the main tuner 100 causing spurious sync pulse generation. However, although the main tuner output can be muted by GPIO#1 during signal absence, such muting prevents verification of channel acquisition during tuning. Furthermore with no signal present, the video image in the PIP (which is part of the Guide) comprises random noise since both the main video (OAM) and PIP video (OAP) paths are muted, the preview PIP is blanked.

In a further advantageous arrangement, during video input absence the muted input is routed to the sync separator which responds by entering a free run mode that generates stable horizontal and vertical sync. These stable sync signals facilitate the generation of a stable, readable on-screen-display during input signal absence. The determination of valid video presence is performed by a tuning sync "video presence detector" which is monitored when the main tuner video is selected. The synchronization deficiencies described previously can also occur with signal absence at any input, for example main tuner, 2nd tuner, aux 1, aux 2, aux 3, component inputs, etc. Thus the advantageous video presence detector arrangement is beneficially employed to detect signal absence at any input.

Figure 7:
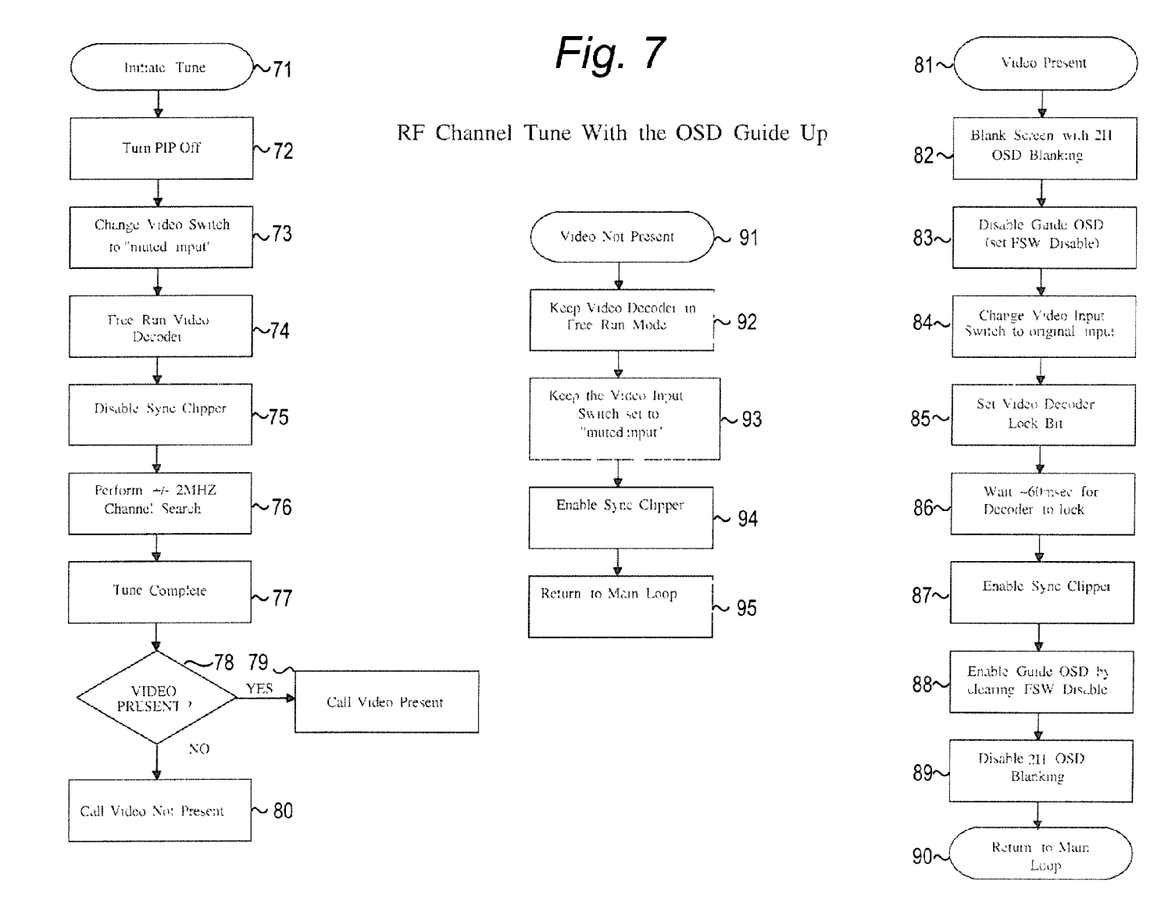
FIG. 7 shows an inventive channel tune sequence "in the Guide" both with and without input video presence.

A further problem and solution is associated with channel tuning. FIG. 7 illustrates the channel tuning process both with and without a video signal present on the channel or video input, and it assumes that the Guide is selected. Tuning is initialed at block 71 of FIG. 7. To prevent noise present in the box surrounding the PIP, the PIP is turned off at block 72 during tuning from within the Guide. The Video Input Switch U10 is changed to the "muted input" condition at block 73, for example the 2nd tuner video FIG. 1. Once the video signal into the Video Decoder is muted that is nominally flat, random noise, the Video Decoder switches to a free-run mode at block 74, via an I²C bus command from micro U8. Also an I²C command disables or inhibits Sync Clipping at block 75, which allows amplified or stretched amplitude sync pulses to be present later in the tuning process while the Video Decoder is attempting to lock, and sync separate signals from the newly selected/found channel. At block 76 a standard +/−2 MHz channel search is performed using the main tuner. This channel search allows for offset air (MATV) or cable channels to be properly tuned. The new channel is acquired at block 77, however, if a channel is not present the tuning system defaults to FCC Nominal channel frequencies. At block 78 the video presence detector is tested for the presence or absence of the selected input, with the result, YES signaled at block 79, or NO signaled at block 80.

If block 79 tests YES, video is present, the sequence continues at block 81, with screen blanking occurring, at block 82, by use of 2H OSD in IC U1. Activating 2H OSD blanking obscures any unwanted transient video effects from being coupled for display as the sync separator in the Video Decoder U3 is locking. At block 83 the fast switch is disabled, FSW Disable, via a general purpose output, GPIO, decoded from the I2C bus by IC U4. This FSW Disable signal saturates Q3 which disables the FSW line from U13, the Gemstar™ OSD generator and consequently inhibits OSD insertion or addition by IC U2.

Figure 5:
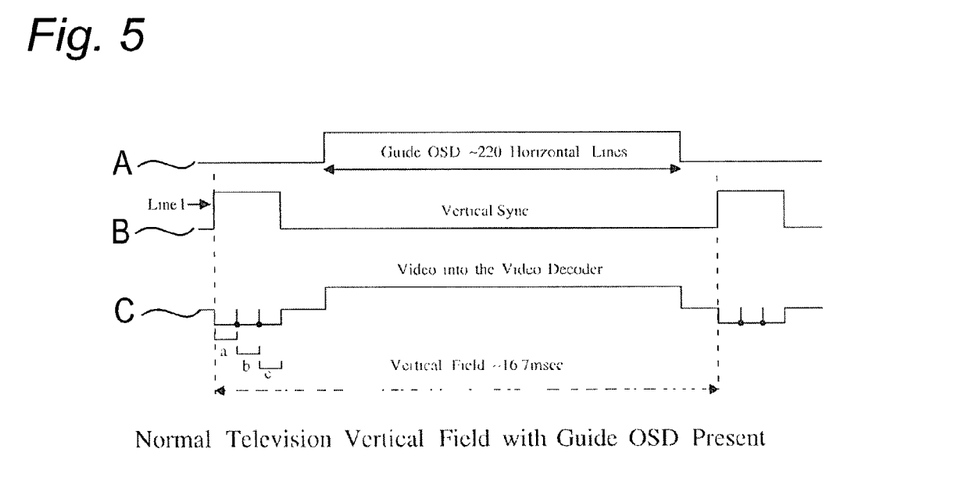
FIG. 5 illustrates the relationship between the Guide OSD overlaid on the incoming video.
Figure 6:
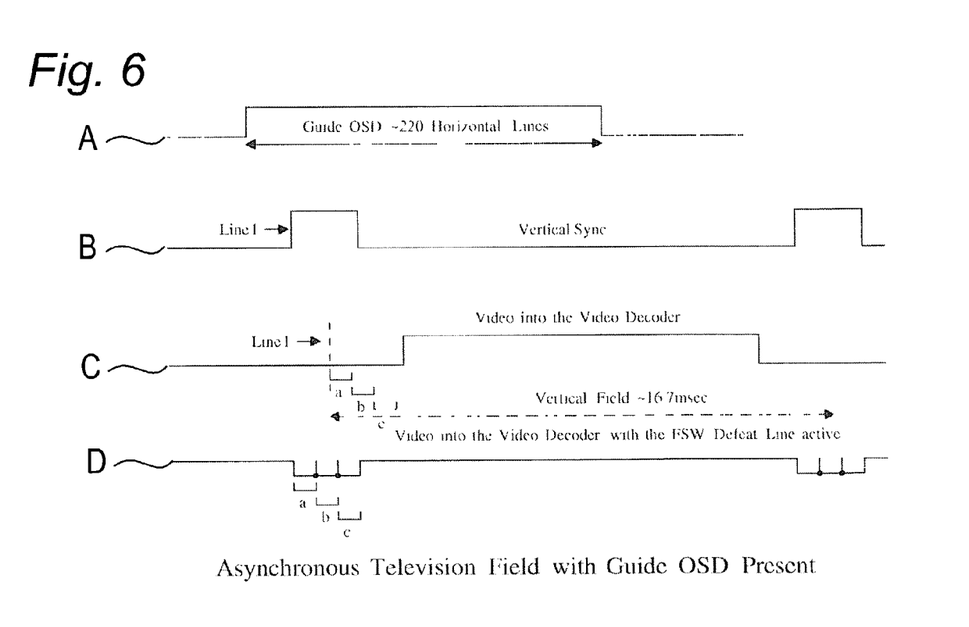
FIG. 6 illustrates a relationship between the Guide OSD overlaid on the incoming video when the OSD and input video are asynchronous following a channel tune.

FIGS. 5 and 6 are helpful in understanding the affects of disabling the FSW line. FIG. 5 shows waveforms A, B and C. Waveform A illustrates the presence of the Guide OSD for approximately 220 of the 262.5 horizontal lines in a field. Waveform B shows the time relationship between Vertical Sync and the Guide OSD. Waveform C depicts the Vertical sync pulse interval with a, b and c representing the pre-equalization pulses, vertical sync pulses, and the post-equalization pulses respectively. In the case of a valid video signal, the Guide OSD which is overlaid on the active video, is not active or present during the Vertical interval. A similar condition if true for the horizontal sync interval, but the vertical interval is the most significant hence it only will be described. With valid video, the vertical sync interval comprising elements a, b and c is present in the luminance signal supplied the Video Decoder U3. The digital sync separator within IC U3 separates the Vertical and Horizontal sync pulses and generates output signals HSYNC and VSYNC which are coupled to synchronize OSD generation in the Guide IC U12.

Immediately after a new channel is tuned, the newly acquired video signal is asynchronous with the Guide OSD that is present. FIG. 6A shows the Guide OSD which is active for approximately 220 of the 262.5 horizontal lines of an SD or 1H field. Since the Guide OSD and the incoming video signal are asynchronous, and the Guide is present for about 220 of the 262.5 lines per field, it could take considerable time for the vertical sync interval to drift into synchronism with the Guide OSD vertical sync and then be detected. Waveform 6B shows the random Vertical Sync that may occur since the Video Decoder is not locked. Waveform 6C shows the luminance signal coupled for sync separation by the Video Decoder with the Guide OSD obscuring, or blanking the vertical sync interval of the newly acquired video signal. Clearly the Video Decoder is not able to lock and separate syncs from the incoming newly selected video signal if the vertical sync interval is missing or obliterated by the Guide OSD. Waveform D shows the newly tuned video with the Guide OSD temporarily removed or inhibited by activating FSW Defeat as depicted at block 83 of FIG. 7.

If video is not present at block 80 of FIG. 7, the sequence continues at block 91, "Video Not Present". When video is absent the Video Decoder is maintained in the free run state at block 92, as employed during the tuning process. In order for the Video Decoder to properly function in the free run condition, the "muted input" mode is selected at block 93 and the Sync Clipper is enabled at block 94 to prevent video level shifts resulting from sync amplitude AGC. At block 95 the control sequence returns to the main loop.

The inventive arrangement employs a "FSW Control" or disable line to temporarily inhibit Guide insertion. This control signal FSW Control is generated responsive to an I²C bus command and decoded by a general purpose input output port (GPIO) of IC U4. The Guide OSD is disabled for approximately 60 mille seconds following the signaled completion of tuning. This advantageous control capability, ensures that the sync separator in the Video Decoder IC will capture the vertical sync block at lines 1–9 of the NTSC Video and generate the proper horizontal and vertical sync to lock the Guide OSD. The inventive momentarily inhibition of the Guide OSD following channel tuning facilitates vertical sync separation of the new signal by Video Decoder. Since the lock time of the digital sync separator is relatively short, the momentary inhibition of the Guide insertion is barely visually perceptible. The preceding inventive arrangements not only greatly reduce acquisition time to achieve stable video and OSD displays, but in addition the visual presentation of video transients resulting from switching between switching between the free run and locked modes are substantially eliminated r.

What is claimed is:

1. A television monitor display, comprising:
   a first selectable source of a first video display signal;
   a second selectable source of a second signal for video display;
   a video processor receiving signals from said first and second selectable sources and controllably combining said second signal with said first video display signal;
   a sync separator coupled to receive said combined signal and generate therefrom separated synchronizing signals; and,
   a controller responsive to user selection of said first selectable source and generating a disable signal for controlling said video processor to inhibit combining of said second signal for a predetermined time.

2. The television monitor display of claim 1, wherein said video processor generates an on screen display video signal where said second signal is superimposed on said first video signal.

3. The television monitor display of claim 1, wherein said disable signal controls a switch that inhibits insertion of on screen display video.

4. The television monitor display of claim 1, wherein said first video display signal includes synchronizing signals.

5. The television monitor display of claim 1, wherein said second signal for video display is without synchronizing signals.

6. The television monitor display of claim 1, wherein said second signal has an active picture duration less than a standard definition television active field period.

7. The television monitor display of claim 1, wherein said predetermined time corresponds to at least three television field periods.

* * * * *